United States Patent
Safranek et al.

(10) Patent No.: US 6,493,809 B1
(45) Date of Patent: Dec. 10, 2002

(54) MAINTAINING ORDER OF WRITE OPERATIONS IN A MULTIPROCESSOR FOR MEMORY CONSISTENCY

(75) Inventors: Robert J. Safranek; Thomas D. Lovett, both of Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,782

(22) Filed: Jan. 28, 2000

(51) Int. Cl.$^7$ ................................. G06F 13/00
(52) U.S. Cl. ........................ 711/167; 711/148
(58) Field of Search ................ 711/148, 141, 711/167

(56) References Cited

U.S. PATENT DOCUMENTS

| | | | |
|---|---|---|---|
| 5,193,163 A | 3/1993 | Sanders et al. | 711/122 |
| 5,398,325 A | 3/1995 | Chang et al. | 711/3 |
| 5,418,921 A * | 5/1995 | Cortney et al. | 711/114 |
| 5,463,753 A | 10/1995 | Fry et al. | 711/146 |
| 5,579,504 A | 11/1996 | Callander et al. | 711/144 |
| 5,623,629 A | 4/1997 | Suzuki | 711/141 |
| 5,699,552 A | 12/1997 | Whittaker | 711/146 |
| 5,900,020 A | 5/1999 | Safranek et al. | 711/167 |
| 6,108,737 A * | 8/2000 | Sharma et al. | 711/147 X |
| 6,108,752 A * | 8/2000 | VanDoren et al. | 711/117 |

OTHER PUBLICATIONS

James, "SCI (Scalable Coherent Interface) Cache Coherence," Cache and Interconnect Architectures in Multiprocessors, Kluwer Academic Publishers, Norwell, Massachusetts, pp. 189–208 (1990).

Tving, "Master Thesis," Multiprocessor Interconnection Using SCI, Feb. 2, 1994.

* cited by examiner

Primary Examiner—David L. Robertson
(74) Attorney, Agent, or Firm—Klarquist Sparkman LLP; Pryor A. Garnett (57) ABSTRACT

A method of invalidating shared cache lines such as on a sharing list by issuing an invalidate acknowledgement before actually invalidating a cache line. The method is useful in multiprocessor systems such as a distributed shared memory (DSM) or non-uniform memory access (NUMA) machines that include a number of interconnected processor nodes each having local memory and caches that store copies of the same data. In such a multiprocessor system using the Scalable Content Interface (SCI) protocol, an invalidate request is sent from the head node on the sharing list to a succeeding node on the list. In response to the invalidate request, the succeeding node issues an invalidate acknowledgement before the cache line is actually invalidated. After issuing the invalidate acknowledgement, the succeeding node initiates invalidation of the cache line. The invalidate acknowledgement can take the form of a response to the head node or a forwarding of the invalidate request to the next succeeding node on the list. To maintain processor consistency, a flag is set each time an invalidate acknowledgement is sent. The flag is cleared after the invalidation of the cache line is completed. Cacheable transactions received at the succeeding node while a flag is set are delayed until the flag is cleared.

24 Claims, 10 Drawing Sheets

MEMORY TAG 34

| LOCK | MEMORY STATE | HEAD POINTER |
|------|--------------|--------------|

FIG. 5A (PRIOR ART)

REMOTE CACHE TAG 36

| ADDRESS | CACHE STATE | FORWARD POINTER | BACKWARD POINTER | VALID | LOCKED |
|---------|-------------|-----------------|------------------|-------|--------|

MAINTAINING ORDER OF WRITE OPERATIONS IN A MULTIPROCESSOR FOR MEMORY CONSISTENCY

TECHNICAL FIELD

This invention relates generally to multiprocessor systems that are comprised of a number of separate but interconnected processor nodes. More particularly, this invention relates to a method for reducing the time required to invalidate shared cache lines that reside on the separate nodes when a copy of the data in one of the lines is changed.

BACKGROUND

Multiprocessor computer systems by definition contain multiple processors that can execute multiple parts of a computer program or multiple distinct programs simultaneously, in a manner known as parallel computing. In general, multiprocessor systems execute multithreaded-programs or single-threaded programs faster than conventional single processor computers, such as personal computers (PCs), that must execute programs sequentially. The actual performance advantage is a function of a number of factors, including the degree to which parts of a multithreaded-program and/or multiple distinct programs can be executed in parallel and the architecture of the particular multiprocessor computer at hand.

Multiprocessor systems may be classified by how they share information among the processors. Shared memory multiprocessors offer a common physical memory address space that all processors can access. Multiple processes or multiple threads within the same process can communicate through shared variables in memory that allow them to read or write to the same memory location in the computer. Message passing multiprocessors, in contrast, have a separate memory space for each processor, requiring processes to communicate through explicit messages to each other.

Shared memory multiprocessors can further be classified by how their memory is physically organized. In distributed shared memory (DSM) machines, the memory is divided into modules physically placed near groups of one or more processors. Although all of the memory modules are globally accessible, a processor can access memory placed nearby faster than memory placed remotely. Because the memory access time differs based on memory location, distributed shared memory machines are also called non-uniform memory access (NUMA) machines. In centralized shared memory machines, on the other hand, all of the memory is physically in one location. Centralized shared memory machines are also called uniform memory access (UMA) machines because the memory is equidistant in time from each of the processors. Both forms of memory organization typically use high-speed cache memory in conjunction with main memory to reduce execution time.

Multiprocessor systems with distributed shared memory are often organized into nodes with one or more processors per node. Included in the node may be a node bus, local memory for the processors, a remote cache for caching data obtained from memory in other nodes, and logic for linking the node with other nodes in the computer. A processor in a node communicates directly with the local memory and communicates indirectly with memory on other nodes through the node's remote cache. For example, if the desired data is in local memory, a processor obtains the data directly from a block (or line) of local memory. However, if the desired data is stored in memory in another node, the processor must access its remote cache to obtain the data. A remote cache hit occurs if the data has been obtained recently and is presently stored in a line of the remote cache. Otherwise a cache miss occurs, and the processor must obtain the desired data from the local memory of another node through the linking logic and place the obtained data in its node's remote cache. Further information on multiprocessor computer systems in general and NUMA machines in particular can be found in a number of works including *Computer Architecture: A Quantitative Approach* ($2^{nd}$ Ed. 1996), by D. Patterson and J. Hennessy.

Data coherency is maintained among the multiple caches and memories of a distributed shared memory machine through a cache coherency protocol such as the protocol described in the Scalable Coherent Interface (SCI)(IEEE 1596). Central to this coherency protocol is the use of doubly linked sharing list structures to keep track of the cache lines of separate remote caches that share the same data. Before the data in one of the linked cache lines can change, such as by a processor writing to a cache line, the other cache lines on the list must be invalidated and the list purged (i.e., dissolved).

An SCI sharing list is constructed using tags that are associated with each line of memory and each line of a remote cache. A memory tag includes a state field and a head pointer that, when a sharing list exists for the memory line, points to the node that is the head of the list. A remote cache tag includes a state field, a backward pointer, and a forward pointer. The backward pointer points to the node that is the next list element toward the home node. The forward pointer points to the node that is the next list element toward the list tail. In the remote cache tag at the list head, the backward pointer points to the home memory whose data is cached. In the remote cache tag at the list tail, the forward pointer is null.

A sharing list is formed, increased, or dissolved whenever a processor tries to read from or write to a line of data that is not present in its remote cache or local memory. In these cases a processor then requests the data from the remote memory storing the data. If no cached copies of the line exist in the computer system, the remote memory responds with the data. A sharing list is then formed with a cache line on the requesting processor's node now storing the data. The pointers in the memory and remote cache tags are changed as described above to designate the node containing the cache line as the list head, with the remote cache tag's forward pointer set to null since there are no other list elements. If a cached copy of the data already exists in the computer system, the memory still responds with the data if it is valid; otherwise, the data is obtained from the present head of the list. Again, the pointers in the memory and remote cache tags are changed to designate the node of the requesting processor as the list head and the old head is moved down the list.

Figure 1A:
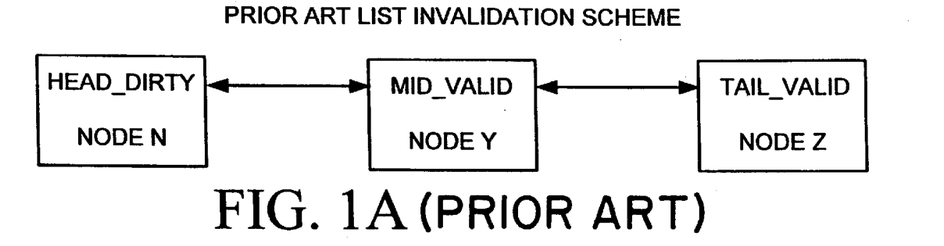
FIGS. 1A–C are a series of figures showing a prior art sharing list invalidation scheme.
Figure 1B:
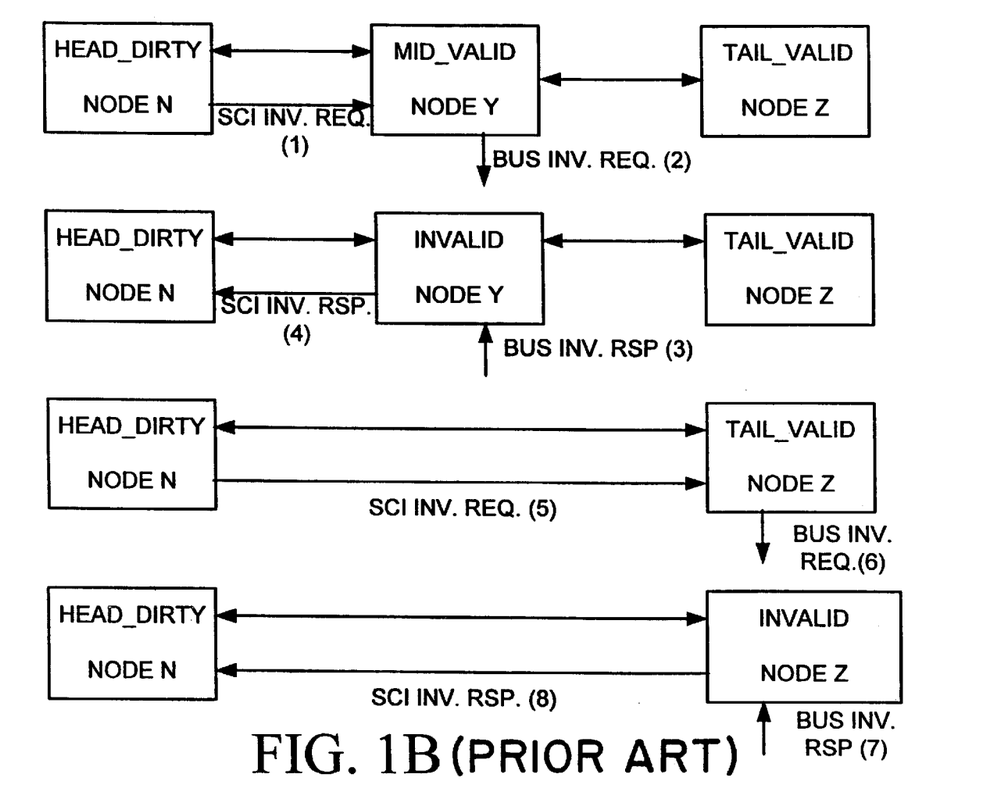
Figure 1C:
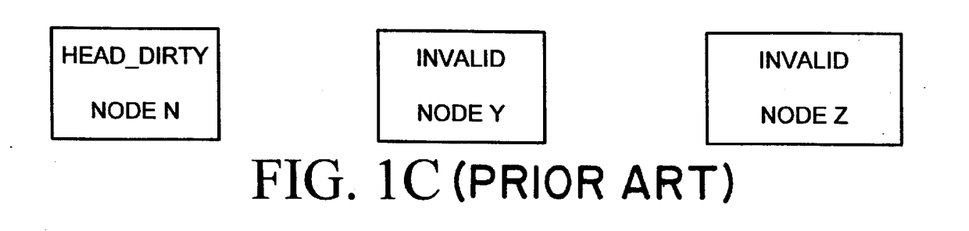

An old sharing list is dissolved and its cache lines invalidated when a processor writes to a memory line that corresponds to the sharing list. The SCI scheme for invalidating a sharing list is shown in FIGS. 1A–C, where a processor writes to a cache line that is shared by other nodes. In FIG. 1A, the state of a sharing list is shown before the scheme is initiated. Node N is the head of the list. As indicated by the bidirectional arrows, the remote cache tag for the shared line points forward to node Y, whose remote cache tag for the line points backward to node N. Similarly, the remote cache tag for the cache line on node Y points forward to node Z, whose remote cache tag for the share line points backward to node Y. Since the remote cache tag for the line on node Z does not point forward to another cache line in this example, node Z is the tail of the list. In FIG. 1B, node N issues an SCI invalidate request (1) to node Y to remove its cache line from the list. Node Y responds through its cache controller by issuing a bus invalidate request (2) on its node bus to its bus controller. The bus controller invalidates the copies of the cache line that exist in the processors' local caches and acknowledges to the cache controller when the invalidate is complete (3). The cache controller then updates the state of its cache line in the remote cache to invalid and issues an invalidate response to node N (4). This response confirms that the cache line has been invalidated and that node Y has been removed from the list. The response also includes the forward pointer to node Z. Using this forward pointer, node N then issues an SCI invalidate request to node Z to remove its cache line from the list (5). Node Z responds in the same manner as node Y. by issuing a bus invalidate request (6) and a bus invalidate response (7) internally and an SCI invalidate response to Node N (8). FIG. 1C shows the state of the nodes' cache lines after the sequence of invalidate requests is complete and the sharing list has been dissolved. The state of the cache line on node N indicates that only its cache line now has valid data (even the memory data is invalid). The states of the cache lines on nodes Y and Z indicate that their copies of the data are invalid.

Although this scheme works, it is slow for several reasons. First, the invalidate request requires multiple responses to the head of the sharing list, one from each element node of the list. Second, each element node must complete the invalidation of the copies of the cache lines stored in the processors' local caches before acknowledging that the invalidation is complete. The problem of multiple responses may be addressed by forwarding the invalidate request from one node to another rather than responding to the list head. The serial nature of the invalidation scheme, however, persists. An element node does not respond to the head of the list or forward the invalidate request to a succeeding node until the element node invalidates all copies of the cache line within the local caches and remote cache.

An objective of the invention, therefore, is to reduce the time for invalidating cache lines on a sharing list by performing some of the requisite actions in parallel. Another objective of the invention is to reduce such time by having a node acknowledge that the invalidate request is complete before all copies of the cache line thereon have actually been invalidated. Another objective of the invention is to reduce such time while maintaining the appropriate processor consistency model.

SUMMARY

A method for invalidating cache lines in a multiprocessor system includes, in response to an invalidate request from a first node, issuing an invalidate acknowledgement by a second node before the cache line on the second node is actually invalidated. The early invalidate acknowledgement can be issued by sending it to the first node or forwarding it to a third node, as desired.

The method may further include, after issuing the invalidate acknowledgement, setting a flag indicating that an invalidation is pending and, after completing the invalidation of the cache line, clearing the flag. This is done to maintain processor consistency.

The method may also include receiving at the second node a cacheable transaction. The flag is then checked to determine whether an invalidation is pending at the second node. If so, execution of the cacheable transaction is delayed until the flag is clear. The cacheable transaction can be any transaction that affects processor consistency, such as issuance of a read response to a node bus, an issuance of a write request to a node bus, or an issuance of an interrupt.

Similarly, a multiprocessor system capable of executing the above methods is shown and described.

The method is particularly applicable to multiprocessor systems using the SCI protocol, in which shared cache lines are connected via a sharing list.

These and other aspects and features of the invention will become apparent from the following detailed description and accompanying drawings.

DETAILED DESCRIPTION

The invention has been implemented within a multiprocessor system such as the one shown and described herein. It should be readily recognized from this disclosure, however, that the invention is not limited to this implementation but can be applied in any suitable computer system using a cache coherency scheme to link together cache lines that share data.

Figure 2:
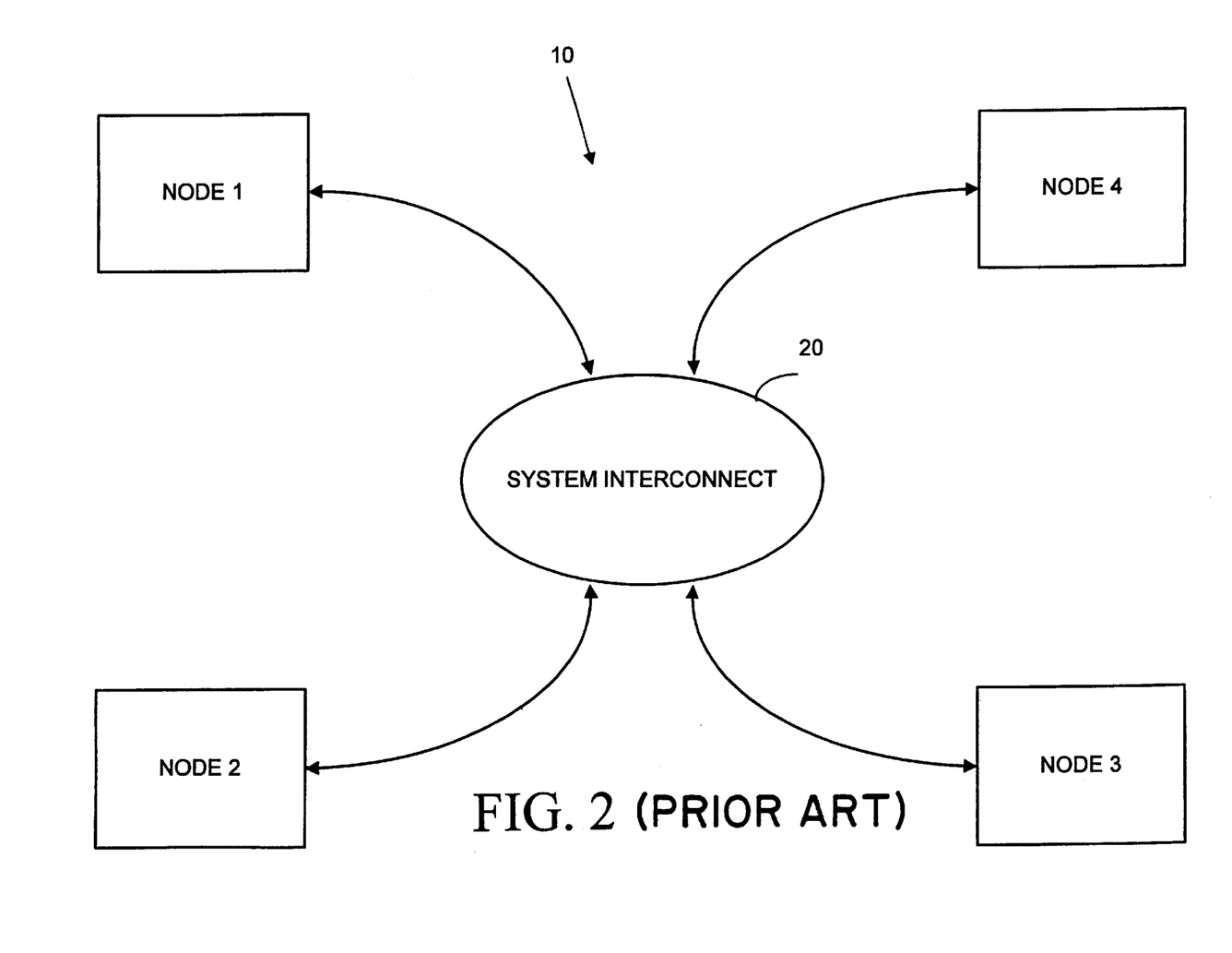
FIG. 2 is a block diagram of a prior art multiprocessor system having multiple processor nodes, with a system interconnect coupling the nodes.

FIG. 2 is a block diagram of a multiprocessor system 10 that uses a computer architecture based on distributed shared memory (DSM). This type of computer system is also known as a NUMA machine. Four nodes 1–4 are shown connected by a system interconnect 20 (i.e., a network) that permits any node to communicate with any other node. The system interconnect allows processors in any node to directly and transparently access the physical memory that resides in any other node. System interconnect 20 is a switch-based network that in the illustrative embodiment uses the Scalable Coherent Interface (SCI) interconnection mechanism. SCI is an IEEE-approved standard that is well documented in a number of publications including *IEEE Std* 1596–1992 (Aug. 2, 1993) and *Multiprocessor Interconnection Using SCI*, a Master Thesis by Ivan Tving, DTH ID-E 579 (1994).

The physical links of interconnect 20 provide high bandwidth and low latency and are scalable to allow for the addition of more nodes. Links that meet these requirements presently include point-to-point interconnects with a data throughput of one gigabyte/second or greater. The links can be configured in any number of suitable ways for connecting nodes 1–4, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report #1058*, University of Wisconsin—Madison.

Node Overview

Figure 3:
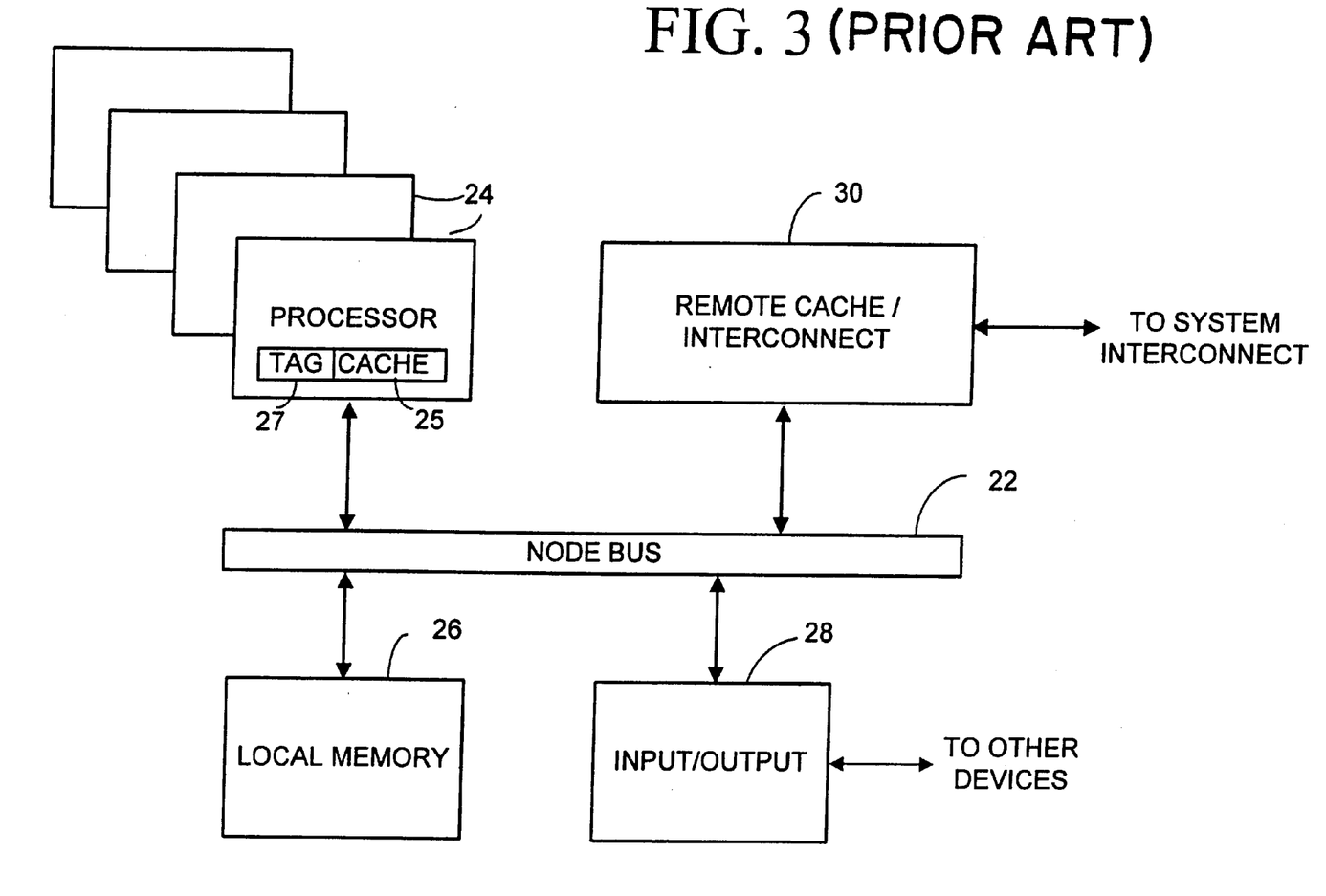
FIG. 3 is a block diagram of one of the nodes of the prior art multiprocessor system of FIG. 2.

A block diagram of a node on multiprocessor system 10 is shown in FIG. 3. The node includes a symmetric multiprocessor (SMP) node bus 22 for connecting multiple data processors 24 to local memory 26. Each processor has one or more local caches 25 with associated cache tags 27 to cache recently-used data (used herein to include all types of information including instructions). Input/output (I/O) device 28, which is also connected to bus 22, connects the node to devices outside computer system 10 for communicating information between the computer system and the outside world. I/O device 28 may be of conventional design and includes means for connecting the node (and hence system 10) to personal computers, local area networks, etc., that wish to communicate with the computer system 10. The I/O device 28 may also allow for connection to peripheral devices, such as floppy disks, hard disks, CD-ROMs, etc. To connect a node to the other nodes in the system, the node includes a system interconnect interface 30. The system interconnect interface forms part of interconnect 20 along with the physical links between nodes and the interface devices on the other nodes of the computer system 10. In the illustrative embodiment, interface 30 is constructed to implement the SCI standard for data communication between the nodes, allowing a processor on one node to transparently access memory physically located on another node. The interface 30 also contains a remote cache in the illustrative embodiment, although the remote cache could also be separate from the system interconnect interface.

For clarity, a node may be referred to as home or remote. A home node is one whose local memory stores a memory block of interest (i.e., the physical address of the memory block falls within the address range supported by the local memory); all of the other nodes are then remote nodes with respect to that memory block. Additionally, a node may be referred to as requesting or responding. A requesting node is one requesting data; a responding node is one furnishing requested data.

Figure 4:
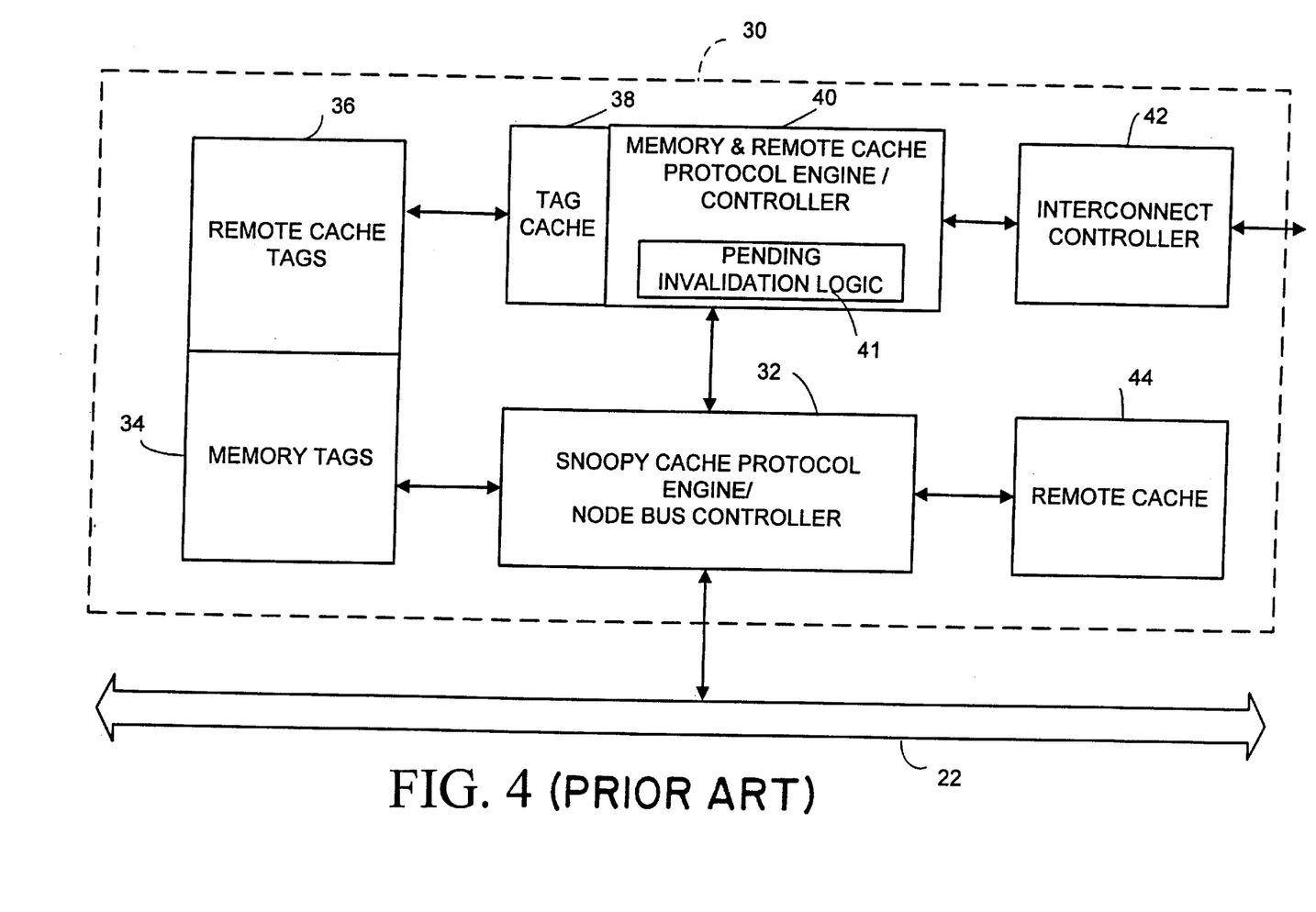
FIG. 4 is a block diagram of an interconnect device within the prior art node of FIG. 3, including cache and bus controllers.

FIG. 4 is a block diagram showing the interconnect device 30 in more detail. The device includes a snoopy cache protocol engine/node bus controller 32; storage for memory and remote cache tags 34 and 36; a tag cache 38; a memory & remote cache protocol engine/controller 40; an interconnect controller 42; and a remote cache 44. Shown within the engine/controller 40 is pending invalidate logic 41. This logic block represents a number of registers, other hardware, and firmware for maintaining the order of cacheable transactions at a node during the invalidation of a sharing list, as will be described. The cache and bus controllers are adapted to issue invalidate requests and invalidate acknowledgements. They may use hardware, firmware, or software to carry out these tasks.

The SCI Cache Coherency Scheme

To maintain coherence among the remote caches in the nodes of computer system 10, the system uses a chained directory scheme defined in the SCI protocol. The chained directory is implemented as a doubly linked sharing list that keeps track of which remote caches share the same data. With this sharing list, remote caches can be notified when the data they share has been changed and thus is no longer valid.

Figure 5A:
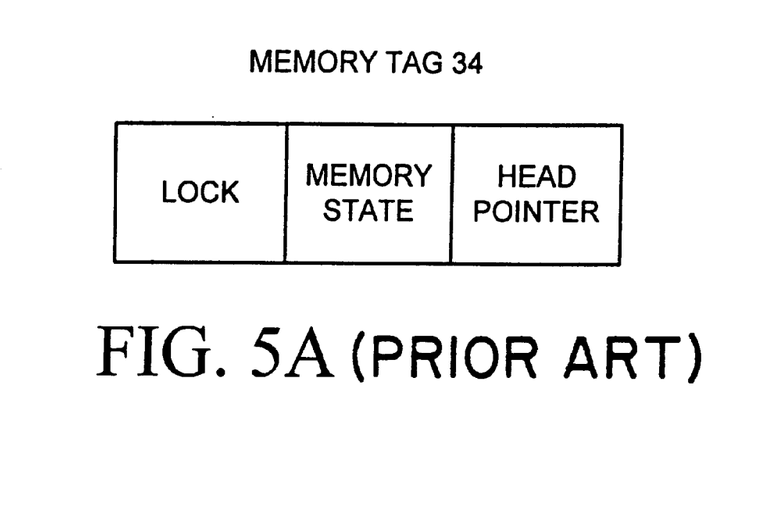
FIGS. 5A and 5B are diagrams showing the fields of a prior art memory tag and a prior art remote cache tag, respectively.
Figure 5B:
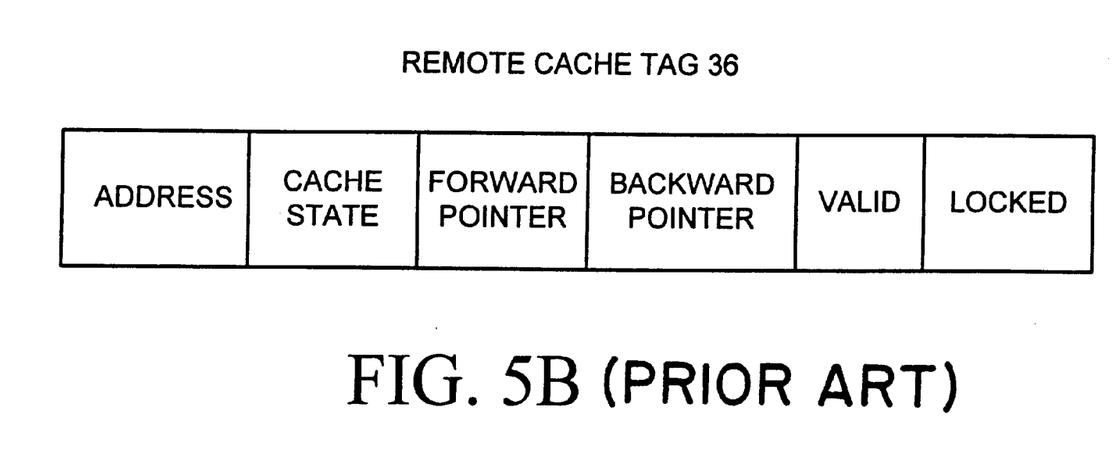

FIG. 5B shows the pertinent fields of a remote cache tag 36 that is used to make the associated cache line and node an element of a sharing list. The remote cache tag is linked into the chained directory to indicate that the node's remote cache 44 contains a copy of the shared data. A remote cache tag 36 contains an Address field, which identifies the memory block cached in the remote cache, and a Cache State (CS) field, which gives the state of the cache line. Table 1 outlines pertinent cache states.

TABLE 1

| Cache State | Description |
| --- | --- |
| CS_INVALID | Line is invalid and can be used for caching new lines |
| CS_ONLY_FRESH | Only cached copy, consistent with memory |
| CS_ONLY_DIRTY | Only cached copy, writeable and inconsistent with memory |
| CS_HEAD_FRESH | Head of fresh sharing list, consistent with memory |
| CS_HEAD_DIRTY | Head of dirty sharing list, writeable and inconsistent with memory |
| CS_MID_VALID | Mid element in a sharing list, possibly inconsistent with memory |
| CS_TAIL_VALID | Tail of a sharing list, possibly inconsistent with memory |

The other fields of the remote cache tag 36 are well defined in the SCI protocol. The Forward Pointer field contains a pointer to the previous node in the sharing list, toward the list tail. The Backward Pointer field contains a pointer to a later node in the sharing list, toward the list head (or to memory if the node containing the cache line is the head of the list). Elements are added to a sharing list as the head of the list, with the oldest element thus being the tail of the list. The Valid field is set to indicate that the remote cache tag is valid. The Locked field is set to indicate that this remote cache tag is to presently remain in the remote cache tag storage and not be replaced by the cache line replacement algorithm.

FIG. 5A shows pertinent fields of a memory tag 34, which maintains the state of local memory 26. The memory tags store information about the states of the memory blocks (lines) stored within local memory 26. The tag has two fields: a Memory State field which indicates the state of the data in the memory block, and a Head Pointer field that points to the cache that is the head of a sharing list containing the memory line's data. Table 2 identifies and describes typical memory states.

TABLE 2

| Memory State | Description |
| --- | --- |
| MS_HOME | No sharing list exists and memory is valid |
| MS_FRESH | Sharing list copies are identical with memory |
| MS_GONE | Sharing list copies might be different from memory |
| MS_BUSY | Memory state is being changed |

Table 3 shows typical cache states in a sharing list for a given memory state. Note that the cache state also reflects the location of the cache in the sharing list: head, midpoint, or tail.

TABLE 3

| Memory | Head | Mid | Tail |
|---|---|---|---|
| MS_HOME | — | — | — |
| MS_FRESH | CS_ONLY_FRESH | — | — |
| MS_FRESH | CS_HEAD_FRESH | — | CS_TAIL_VALID |
| MS_FRESH | CS_HEAD_FRESH | CS_MID_VALID | CS_TAIL_VALID |
| MS_GONE | CS_ONLY_DIRTY | — | — |
| MS_GONE | CS_HEAD_DIRTY | — | CS_TAIL_VALID |
| MS_GONE | CS_HEAD_DIRTY | CS_MID_VALID | CS_TAIL_VALID |

Creating a Sharing list

The SCI scheme for constructing a sharing list is best understood by example. If a processor 24 in node 1 requests to read data that is not in its local cache 25, the request is first reviewed by snoopy cache protocol engine 32. The protocol engine 32 compares the address of the requested data with the memory tags 34 and remote cache tags 36 to determine if the data is stored in the node. If the data's address is in local memory, then node 1 is the home node for the memory block containing the data. A memory tag 34 exists and indicates whether the data is valid and, if not, indicates through its head pointer on which node the valid data can be found (i.e., the location of the head of the sharing list). If the data's address is not in local memory 26, there is no memory tag 34 for it. However, if a copy of the data has previously been stored in the node's remote cache 44, then a remote cache tag 36 exists for the data. The tag 36 indicates whether the data is valid. If invalid, the processor 24 obtains a copy of the valid data from the list head or memory containing the valid data and becomes the new head of the list, as described below.

If the processor requests to write data that is not in its local cache 25, the protocol engine 32 reviews the address to determine if a memory tag 34 or remote cache tag 36 exists for the address. The procedure is the same as for the read, except that a present sharing list containing the data to be changed by the write must be invalidated. If the data to be changed is already in the node's remote cache 44, then node 1 is already on a sharing list. Unless node 1 is already the head of the list, it is first removed from the list and then made the head before the list is invalidated. Assume this is the case. Protocol engine 40 then sends a message to the node "below" node 1 on the list, passing it its backward pointer so that the node below now points to the node "above" node 1. Protocol engine 40 then sends a message to the node above, passing it its forward pointer so that the node above now points to the node below. Node 1 is now off the sharing list. Protocol engine 40 then sends a message to the home node (such as node 2) for the data being changed, indicating that it wants to be head of the list and that it be allowed to write the memory block containing the data. The home node responds by setting its head pointer to point to node 1, changing its memory state to GONE, and returning the requested data in the memory block and the pointer to the "old" head of the current sharing list for the memory block. Finally, protocol engine 40 sends a message to the old head informing the old head that it is no longer the head and proceeds to invalidate the present sharing list, as will be described. The cache state of tag 36 in node 1 for this memory block is now $ONLY_{13}$ DIRTY, since it is presently the only element of a new sharing list and is inconsistent with the data in memory. If processors in other nodes read this data, these nodes will be added to the new list and the state of tag 36 for the cache line on this node will change to TAIL.

Messages are sent between nodes through the memory & remote cache protocol engine 40 and interconnect controller 42 in standard SCI format. Engine 40 puts together an appropriate SCI packet and passes it to controller 42 for sending to the desired node. The interconnect controller provides the SCI-compliant link-level interface to the other nodes of system 10. It also contains the link-level queues and the associated arbitration, queue mechanisms, and error checking to provide SCI-packet delivery services for the node.

Returning to the example, if the requested valid data is not in remote cache 44 or local memory 26, the snoopy cache protocol engine 32 passes the data request to remote cache protocol engine 40. Engine 40 then sends the request in the manner described via controller 42 to the home node for the data. The memory tag for the requested memory line in the home node is checked to determine if the data stored in memory is valid (HOME or FRESH). If so, the home node returns a copy of the data to node 1. If not, the head pointer field of the memory tag is checked to find the head of the list, and a copy of the data is obtained therefrom. The memory tag's head pointer in the home node is changed to point to remote cache 44 on node 1 as the new head of the sharing list. If the processor request from node 1 is for a possible write, the tag's memory state is also changed, to GONE since the cache line and memory will soon be inconsistent.

The data retrieved from memory on the home node is sent to node 1 and provided to the processor 24 and its cache 25 as well as stored in remote cache 44. A remote cache tag 36 is then created for the stored data. At this point, the address of the retrieved memory block, the cache state and the backward pointer (to the node where the memory from which the data was retrieved is located, here the home node) are known and these fields in the remote cache tag 36 in node 1 are completed. If the processor request is a write, then remote cache 44 is now the head of a new sharing list and there is no forward pointer to other list elements. If the processor request is a read and the memory state is FRESH (indicating at least one remote cache has a valid copy of the memory's data line), then the tag's forward pointer is set to point to the node that was the previous head of the list.

The list will grow as other nodes obtain copies of the data in remote cache 44. For example, if node 2 requests the same data that is in the remote cache of node 1, node 2 will become the head of the list. The backward pointer for the remote cache tag in node 1 would then change from pointing to the node whose memory is the home for the data to pointing to node 2.

Invalidating a Sharing list

Sharing lists of cache lines are maintained so that all nodes that share the same data can be notified when the shared data is changed. For example, assume in FIG. 2 that a sharing list for a certain memory block located in local memory of node 4 is headed by node 2 and also contains node 1 and node 3. If a processor 24 in node 1 now writes to this block in its remote cache 44, as in the above example, then the other nodes on the sharing list are serially notified to invalidate their copies of the data and the list is purged (i.e., dissolved). This is known as invalidating a sharing list. As shown in FIGS. 1A–C, the conventional SCI invalidation scheme notifies each element of the list one at a time to invalidate its copies of the shared data and requires each element of the list to respond to an invalidate request from the head of the list by sending the head an invalidate response. If there are ten elements of a list, for example, the nine non-head elements must each send an invalidate response through the system interconnect 20 to the node that is the head of the list.

In the conventional SCI approach, dissolving a sharing list and invalidating the cache lines thereon requires several steps. Referring again to FIGS. 1–4, a bus controller 32 on node N issues to cache controller 40 an invalidate request (not shown). Cache controller 40 looks up in remote cache tags 36 the cache line to be invalidated, builds an SCI invalidate request, and sends the request (1) to remote node Y (indicated in the forward pointer of the remote cache tag).

On node Y, interconnect controller 42 receives the SCI invalidate request and passes it to its cache controller 40. Cache controller 40 checks the state of the cache line and, in most cases, issues an invalidate (2) to bus controller 32 to invalidate the lines stored in the local processor caches 25. Once these invalidates have been accomplished, bus controller 32 acknowledges in a response to the cache controller that they are complete (3). The cache controller then updates its remote cache tag 36 for the cache line to indicate the line is invalid. It then issues an SCI response (4) to node N.

On node N, the SCI response from node Y is received by the interconnect controller 42 and forwarded to the cache controller 40. The cache controller processes the response and determines that node Y is no longer on the sharing list. The controller then sends an SCI invalidate request to node Z (5). On node Z, interconnect controller 42 receives the SCI invalidate request and passes it to its cache controller 40. Cache controller 40 checks the state of the cache line and, in most cases, issues an invalidate (6) to bus controller 32 to invalidate the lines stored in the local processor caches 25. Once these invalidates have been accomplished, bus controller 32 acknowledges in a response to the cache controller that they are complete (7). The cache controller then updates its remote cache tag 36 for the cache line to indicate the line is invalid. It then issues an SCI response (8) to node N.

The above steps are repeated for each node on the sharing list. This continues until the tail node responds (Z, in this example). With this response the cache controller of node N detects that the SCI list is completely purged. The controller then updates its cache tag 36 to indicate that the line holds the only valid data and issues an acknowledge to bus controller 32 to complete the transaction.

One of the drawbacks of the conventional approach, as noted above, is that the steps for invalidating the cache lines on the list are performed serially, not concurrently. No step is taken until the previous step is complete. This can create a significant delay if the sharing list is lengthy. In accordance with the invention, this delay can be significantly reduced by performing several of these steps in parallel. To ensure that the proper order of cacheable transactions is maintained in the parallel operation, safeguards are added to the multiprocessor system.

Figure 6:
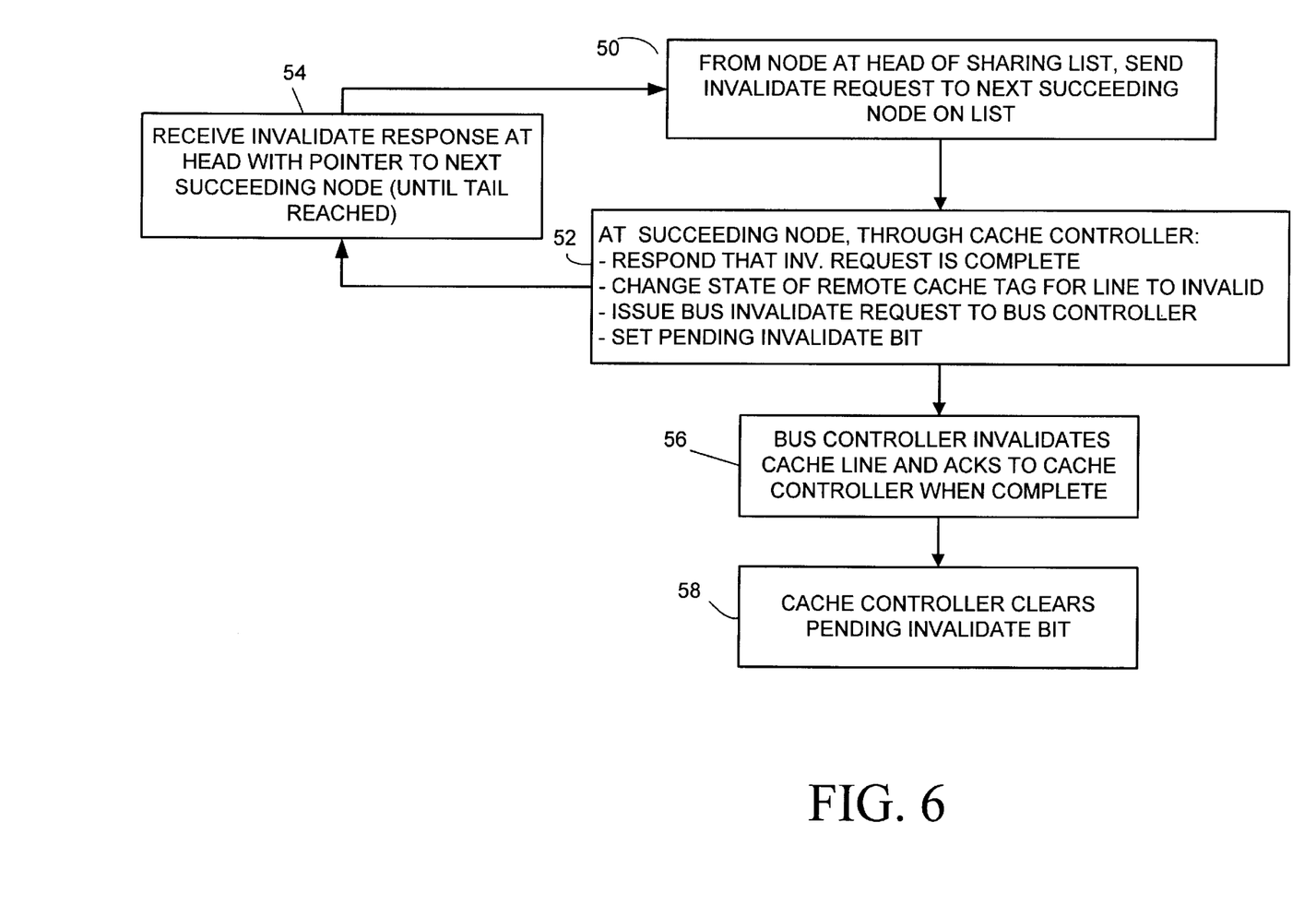
FIG. 6 is a flowchart of a method of invalidating a sharing list in accordance with the invention.
Figure 7A:
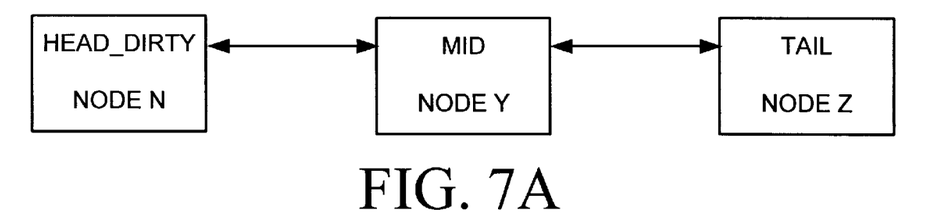
FIGS. 7A–C is a series of figures showing a first sharing list invalidation scheme in accordance with the invention.
Figure 7B:
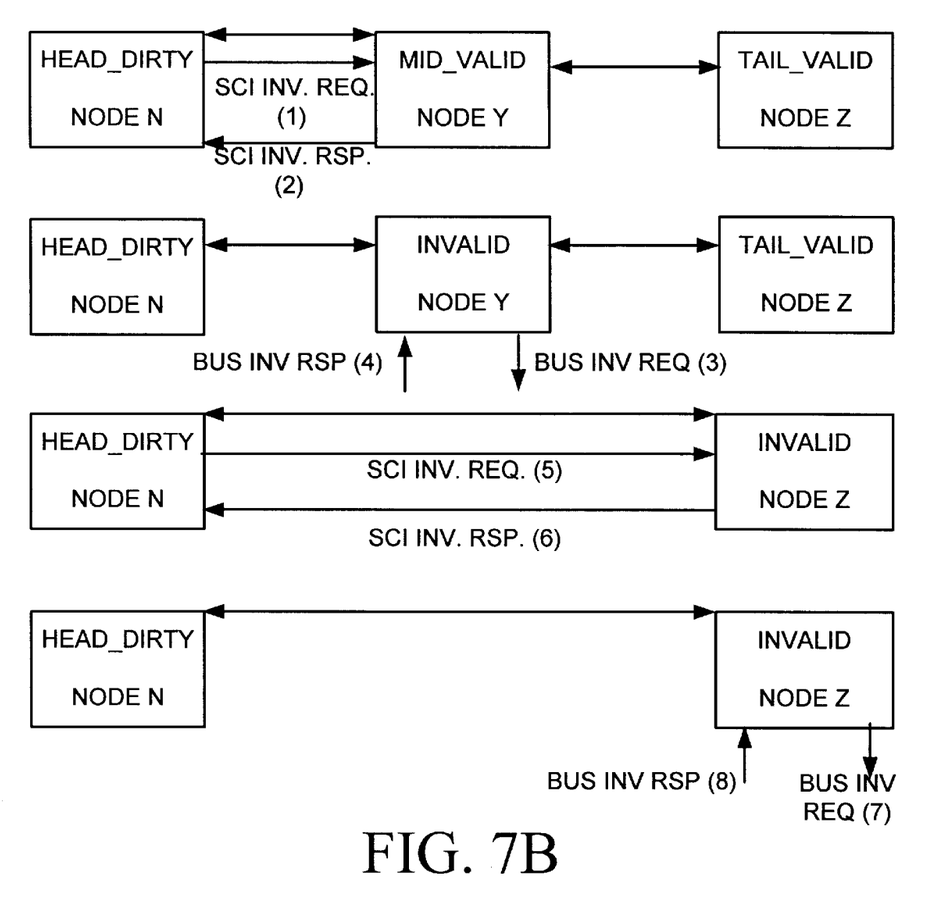
Figure 7C:
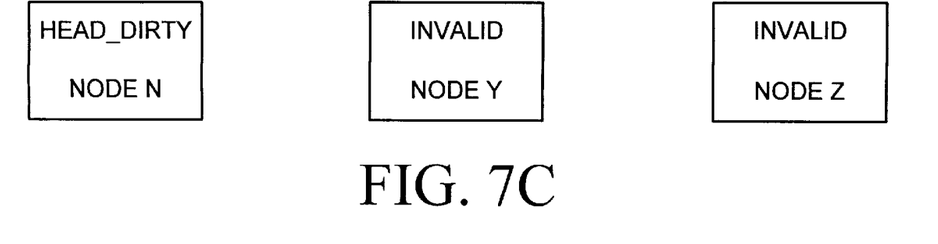

FIGS. 6–8 illustrate a method in accordance with the invention for reducing the time to dissolve a sharing list by performing several of the steps concurrently. From the node at the head of the sharing list, an invalidate request is sent to the succeeding node (block 50). In FIG. 7B, this is shown by head node N sending the invalidate request SCI Inv. Req. (1) to succeeding node Y. At the succeeding node, the cache controller 40 checks the state of the cache line and takes several other steps (block 52). It immediately issues an invalidate acknowledgement by responding to the head node that the invalidate is complete (although it is not) and sends it a pointer to the next succeeding node on the list (block 54). It then issues a bus invalidate request to the bus controller 32 and updates the remote cache tag 36 for the cache line to an invalid state. It also sets a flag such as a pending invalidate bit in a register within logic 41. In FIG. 7B, node Y is shown as immediately issuing the invalidate acknowledgement SCI Inv. Rsp. (2) to node N, then issuing the bus invalidate request Bus Inv. Req. (3). While the head node is receiving the invalidate acknowledgement from the succeeding node (block 54), the succeeding node is invalidating the cache lines in the local processor caches. Specifically, the bus controller 32 on the succeeding node responds to the cache controller 40 by updating the state of cache tags 27 for these local cache lines to an invalid state and then issuing a bus invalidate acknowledgement to the cache controller when the invalidation is completed (block 56). In response, the cache controller clears the flag (block 58). In FIG. 7B, the bus invalidate acknowledgement is Bus Inv. Rsp. (4). The steps are repeated for node Z (5–8) and any succeeding nodes. The dissolved list is shown in FIG. 7C.

At this point, the cache controller 40 in the head node detects that the SCI list is dissolved and issues the acknowledge to its bus controller 32, and the invalidation is complete. However, the time required for completing the invalidation is significantly less than in the conventional approach because many of the steps overlap in time. At no time in the inventive method is the head node required to wait for an invalidate to actually complete on a succeeding node before sending an SCI invalidate request.

The early acknowledgement provided by the method, however, poses some risk. The order of writes from any single processor in system 10 must be observed by the other processors in the system in the order issued. This is known as maintaining processor consistency. But the early acknowledgement can result in a later write by a processor being observed by the other processors before an earlier write is observed, resulting in errors. Writes can be observed by the other processors in three ways: by read response, by interrupt, and by writeback. A read response is the passing of data from a local processor across the interconnect 20 to a remote processor that has requested it. The risk with a read response is that the second write can be read and acted upon before the first write is observed and its impact considered. For example, assume that a local processor on node 1 is writing data in cache line A and then writes a completion signal in cache line B once the write to cache line A is complete. Remote processors on other nodes in system 10 are constantly reading line B in a manner known as "spinning," waiting for the completion signal. With early acknowledgement of the invalidate by the remote nodes, the local processor on node 1 will write to line B even though the now out-of-date copies of cache line A in the remote nodes have not been invalidated and replaced with the new line A. A processor on a remote node, observing the write to line B via the new value before the out-of-date copy of cache line A is actually invalidated, will mistakenly assume that its out-of-date copy is current and act on it.

The same risk exists with interrupts, which are signals sent to processors to notify them that a certain event has occurred. Continuing with the above example, an interrupt is used to provide the completion signal. The interrupt is sent to all other processors upon the receipt of the early acknowledgements and completion of the write to line A. As with the read response described above, a processor on a remote node can observe the interrupt before the processor's cache line is invalidated and thus before the processor observes the write to line A.

A similar risk exists with write-back requests, which is the writing of data back to its home memory. This can send the data across the interconnect 20 if the home memory for the data is on a node remote from the node having the current data copy. Continuing again with the above example, assume that a processor experiences a capacity-miss in its cache (cache full but not containing the desired cache line) immediately following the write of line B to the cache. Assume further that line B is evicted from the cache to make way for the new entry. Because line B differs from what is stored in the home memory for line B, it must be written back to its memory location to update the memory. A copy of line B is then installed in the home memory (which is on a node remote from where line B is cached). A processor on the remote node, observing the write to line B (the completion signal) before its copy of cache line A is actually invalidated, will mistakenly assume that its out-of-date copy is current and act on it.

To eliminate these risks of error, safeguards should be added to maintain the order of cacheable transactions (e.g., a read response, an interrupt, or a write-back request) at a node during invalidation of a sharing list. This is the purpose of the pending invalidate logic 41 in FIG. 4 and the setting and clearing of pending invalidate bits shown in the flowchart of FIG. 6.

Figure 8:
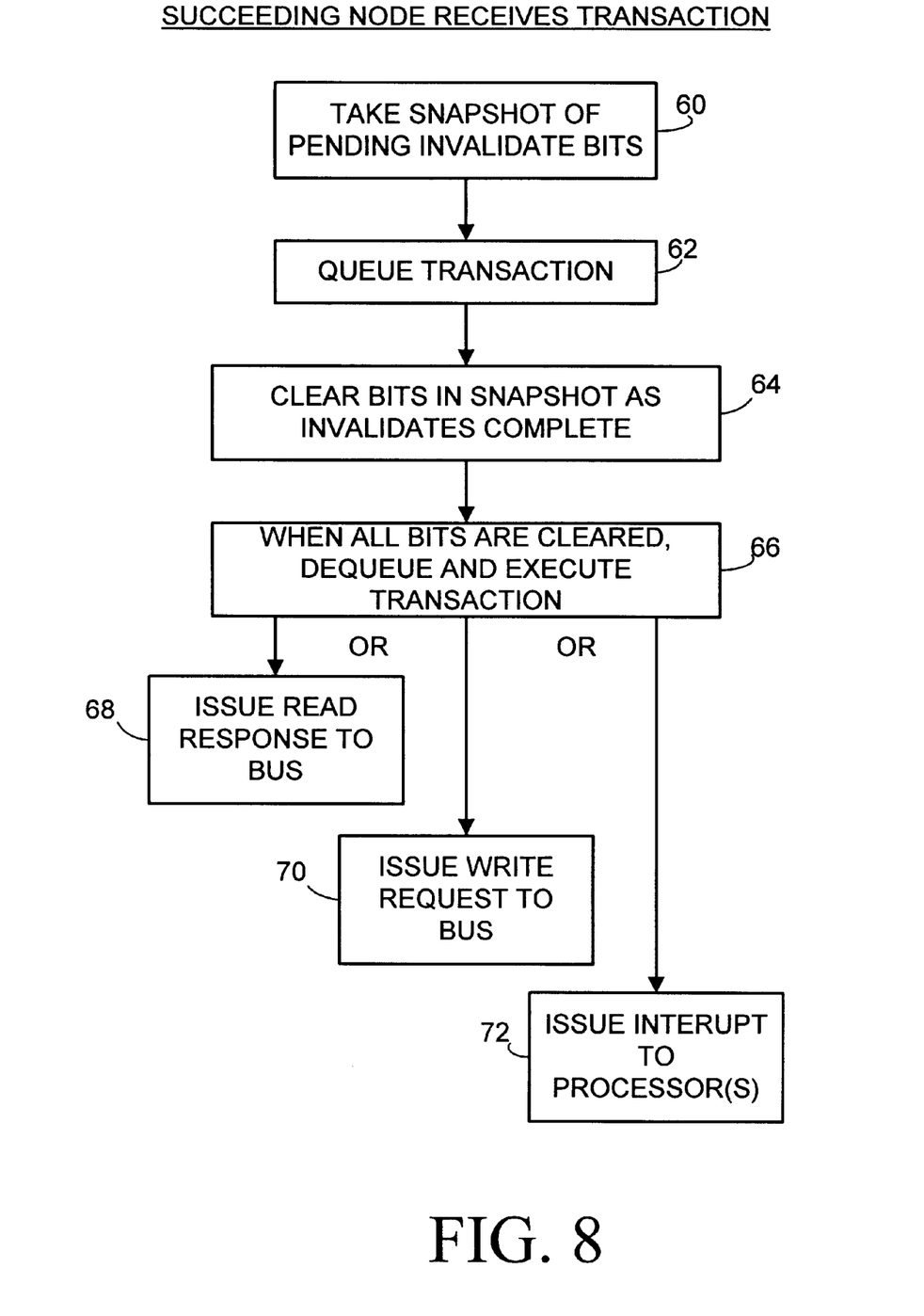
FIG. 8 is a flowchart of a method for maintaining the order of transactions at a node during the invalidation of a sharing list.

FIG. 8 is a flowchart of a method for processing cacheable transactions at a node during the invalidation of a sharing list. As a cacheable transaction is received by the cache controller on a remote node, a "snapshot" is taken of the pending invalidate bits (block 60). A separate snapshot is made for each cacheable transaction at the time of its receipt. Recall from FIG. 6 that a pending invalidate bit is set each time an early acknowledgement is given by the cache controller 40. These bits are located in a register, and the act of taking a snapshot includes making a copy of the register's contents when the cacheable transaction is received. The cacheable transaction is then queued for processing (block 62), awaiting clearance of the pending invalidate bits. As the invalidates of the cache lines on the node actually complete, the bits within the snapshot are cleared (block 64). When all bits within the snapshot for a transaction are cleared, the pending transaction is removed from the queue and processed (block 66). In the illustrative embodiment, these transactions can be the issue of a read response to the bus (block 68), the issue of a write request to the bus (block 70), or the issue of an interrupt to the processor(s) (block 72). Other cacheable transactions subject to this method are, of course, possible.

Processor consistency is assured by delaying certain cacheable transactions until the invalidates within a node actually complete. However, the time required for invalidating a cache line is greatly reduced because the invalidate acknowledgements between nodes proceed without waiting for the invalidates within the nodes to actually complete. With this method, the delay in the invalidating of a sharing list is localized to each node.

Figure 9A:
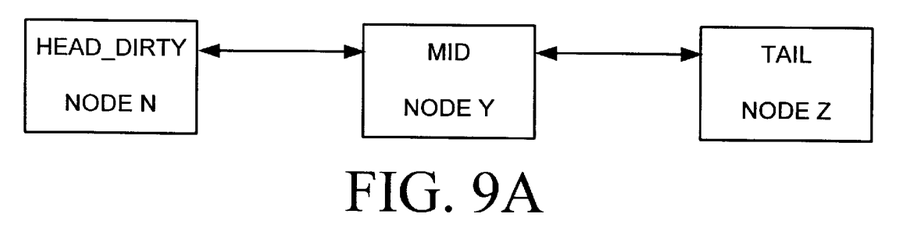
FIGS. 9A–C is a series of figures showing a second sharing list invalidation scheme in accordance with the invention.
Figure 9B:
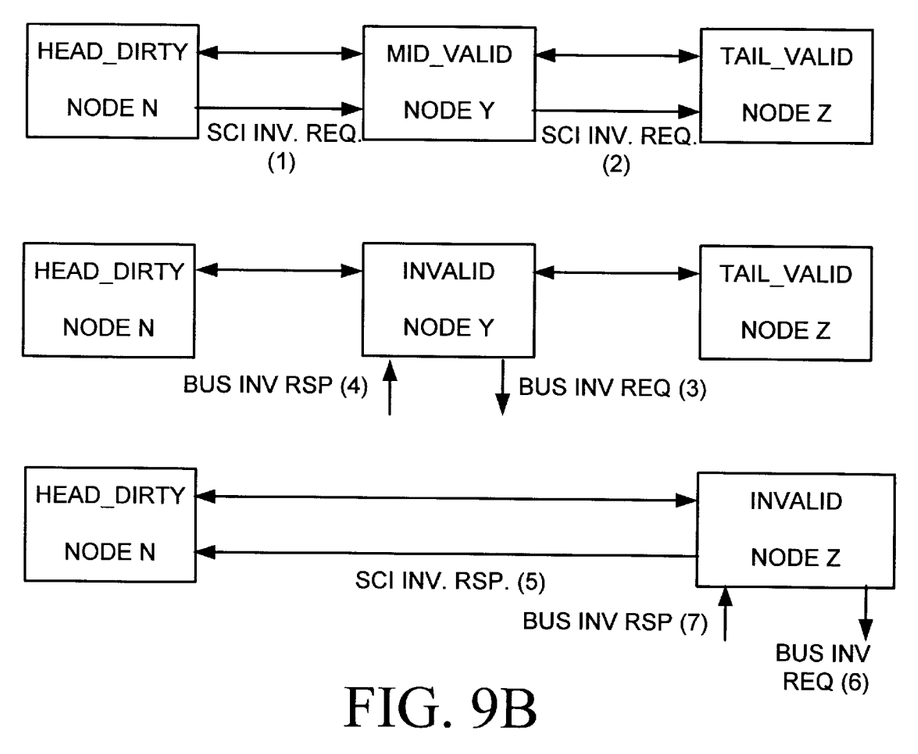
Figure 9C:
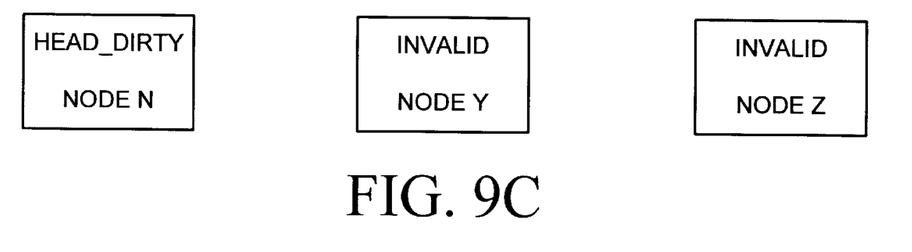

FIGS. 9A–C is a series of figures showing a second sharing list invalidation scheme in accordance with the invention. This scheme avoids the multiple SCI invalidate responses that occur in the scheme of FIGS. 7A–C. Rather than issuing the invalidate acknowledgement in the form of a response to the head node N, node Y issues an invalidate acknowledgement by forwarding the invalidate request SCI Inv. Req. (2) to node Z. The cache controller on node Y then issues a bus invalidate request (3) and receives a bus invalidate response (4). In the meantime, nodes Z issues an SCI Inv. Rsp. (5), and then the cache and bus controllers on node Z work to invalidate the local cache lines through a bus invalidate request (6) and bus invalidate response (7). Other than the forwarding of the invalidate request, this scheme works in the same manner as that of FIGS. 7A–C.

Figure 10A:
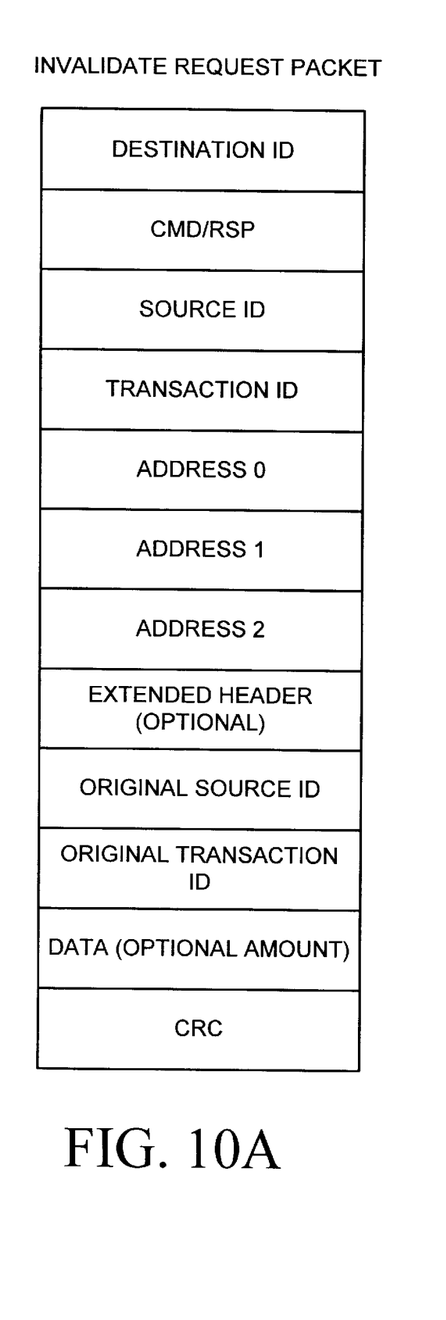
FIGS. 10A–B show the fields of an invalidate request packet and invalidate response packet in accordance with the second sharing list invalidation scheme.
Figure 10B:
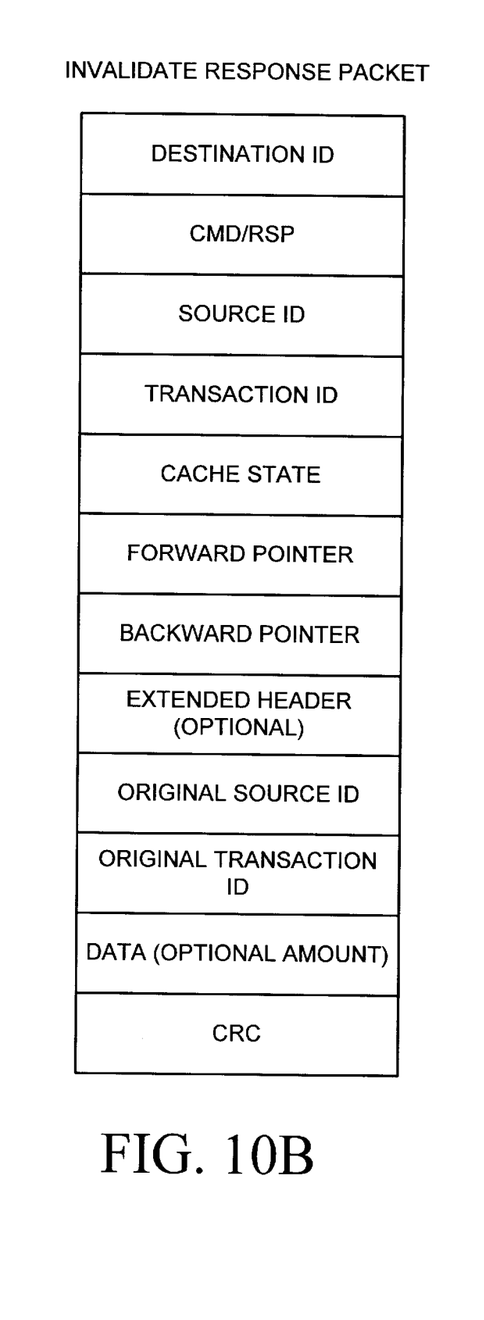

In the scheme of FIGS. 9A–9C, the nodes communicate the invalidate request and response to each other through data packets such as those shown in FIGS. 10A and 10B. The invalidate request packet in FIG. 10A is similar to the packet used in the conventional SCI invalidation scheme but with some significant changes. As in the standard scheme, a Destination ID field designates the node to which the packet is destined, a Source ID field designates the node from which the packet is sent, and three Address fields give the address of the cache line on the destination node. Unlike the standard scheme, however, the packet also includes fields for the Original Source ID (the head of the list) and the Original Transaction ID. These two fields are stored in an area of the Extended Header field unused by the SCI invalidation packet. Each succeeding node changes the Source and Destination ID fields of the invalidate request packet to forward the packet to the next succeeding node on the list. The contents of the rest of the packet fields remain the same. This forwarding of the invalidate request packet continues until the tail node receives the packet.

Recognizing its status as the tail of the list, the tail node reads the Original Source ID and Transaction ID fields to determine the identity of the head of the list. The tail node then generates the invalidate response packet of FIG. 10B, inserting the head of the list in the Destination ID field and itself in the Source ID field. The tail node also writes into the Address fields its cache state before invalidation ($CS_{13}$ TAIL_VALID) and its forward and backward pointers. The response packet is then transmitted to the head node of the list to confirm that the sharing list has been successfully purged.

If the scheme of FIGS. 9A–9C fails for some reason, then the scheme of FIGS. 6–8 can be followed by default. For example, a node may be unable to forward an invalidate request to the next node on the list because the queue of the forwarding node is full. In this circumstance the forwarding node instead sends a invalidate response packet back to the head of the list. This response includes, of course, a forward pointer to the succeeding node on the list. The head of the list then invokes the method again and sends the invalidate request to the next succeeding node on the list. The method then proceeds as shown and described above unless the request packet again cannot be forwarded.

Having illustrated and described the principles of the invention in an exemplary embodiment, it should be apparent to those skilled in the art that the illustrative embodiment can be modified in arrangement and detail without departing from such principles. For example, the invention may be used in cache coherency protocols other than SCI. For example, it may be used with broadcast protocols, sharing vector protocols, or other protocols. The exact timing of issuing the invalidate acknowledgement and initiating invalidation of the cache line may be varied. The flag may take other forms than bits. Many of the software aspects of the embodiment may be implemented in hardware and many of the hardware aspects may be implemented in software. In view of the many possible embodiments to which the principles of the invention may be applied, it should be understood that the illustrative embodiment is intended to teach these principles and is not intended to be a limitation on the scope of the invention defined in the following claims. We therefore claim as our invention all that comes within the scope and spirit of these claims and their equivalents.

We claim:

1. In a multiprocessor system having a number of interconnected processor nodes each containing one or more caches, a method of invalidating cache lines on different nodes linked in a sharing list, the method comprising:

from a node at the head of the list, sending an invalidate request to a succeeding node on the list, the invalidate request for invalidating a cache line on the succeeding node; and in response to the invalidate request, issuing on the succeeding node an invalidate acknowledgement before actually invalidating the cache line.

2. The method of claim 1 wherein issuing on the succeeding node an invalidate acknowledgement includes responding with the invalidate acknowledgement to the head of the list.

3. The method of claim 1 wherein issuing on the succeeding node an invalidate acknowledgement includes forwarding the invalidate request to a succeeding node on the list.

4. The method of claim 1 wherein the invalidate request and the invalidate acknowledgement conform to an SCI protocol.

5. The method of claim 1 wherein the step of issuing an invalidate acknowledgement is repeated for each succeeding node on the sharing list in response to an invalidate request.

6. The method of claim 1 including, after issuing the invalidate acknowledgement, setting a flag indicating that an invalidation of a cache line is pending.

7. The method of claim 6 including, after actually invalidating the cache line, clearing the flag.

8. The method of claim 1 including:

receiving at the succeeding node a cacheable transaction;

in response, determining whether an invalidation is pending at the succeeding node; and if so, delaying the cacheable transaction until after the cache line is actually invalidated.

9. The method of claim 8 wherein a cacheable transaction includes an issuance of a read response to a node bus, an issuance of a write request to a node bus, or an issuance of an interrupt.

10. The method of claim 1 wherein actually invalidating the cache line includes:

issuing a bus invalidate request;

invalidating the cache line in response to the bus invalidate request; and issuing a bus invalidate acknowledgement that the invalidation of the cache line is completed.

11. The method of claim 1 including initiating an invalidation of the cache line on the succeeding node after issuing the invalidate acknowledgement.

12. A computer-readable medium on which is stored computer instructions that perform the steps of claim 1.

13. The method of claim 1 wherein each step is performed by a cache controller.

14. A multiprocessor system having a number of interconnected processor nodes each containing one or more caches, apparatus for invalidating cache lines on different nodes linked in a sharing list, the system further comprising:

a first cache controller on node at the head of the list, the first cache controller adapted to send an invalidate request to a succeeding node on the list to invalidate a cache line on the succeeding node;

a second cache controller on a succeeding node on the list, the second cache controller adapted to receive the invalidate request and respond by issuing an invalidate acknowledgement before the cache line is actually invalidated.

15. The multiprocessor system of claim 14 wherein the second cache controller is adapted to issue the invalidate acknowledgement by responding to the head of the list.

16. The multiprocessor system of claim 14 wherein the second cache controller is adapted to issue the invalidate acknowledgement by forwarding the invalidate request to a succeeding node on the list.

17. The multiprocessor system of claim 14 including a flag on the succeeding node, the flag being set when an invalidation of a cache line is pending and being cleared after the cache line is actually invalidated.

18. The multiprocessor system of claim 14 wherein the second controller is adapted to invalidate a cache line by issuing a bus invalidate request, and the system further includes a bus controller adapted to receive the bus invalidate request, invalidate the cache line in response, and issue a bus invalidate acknowledgement to the cache controller.

19. In a multiprocessor system having a number of interconnected processor nodes each containing one or more caches, a method of invalidating cache lines on different nodes, the method comprising:

from a first node, sending an invalidate request to a second node, the invalidate request for invalidating a cache line on the second node; and in response to the invalidate request, issuing on the second node an invalidate acknowledgement before actually invalidating the cache line.

20. The method of claim 19 wherein issuing on the second node an invalidate acknowledgement includes responding with the invalidate acknowledgement to the first node.

21. The method of claim 19 wherein issuing on the second node an invalidate acknowledgement includes forwarding the invalidate request to a third node.

22. The method of claim 19 including, after issuing the invalidate acknowledgement, setting a flag indicating that an invalidation of a cache line is pending.

23. The method of claim 22 including, after actually invalidating the cache line, clearing the flag.

24. The method of claim 19 including:

receiving at the second node a cacheable transaction;

in response, determining whether an invalidation is pending at the second node; and if so, delaying the cacheable transaction until after the cache line is actually invalidated.

* * * * *